March 21, 1944.   T. H. BRIGGS ET AL   2,344,797
VEHICLE STEERING MECHANISM
Filed Dec. 12, 1942
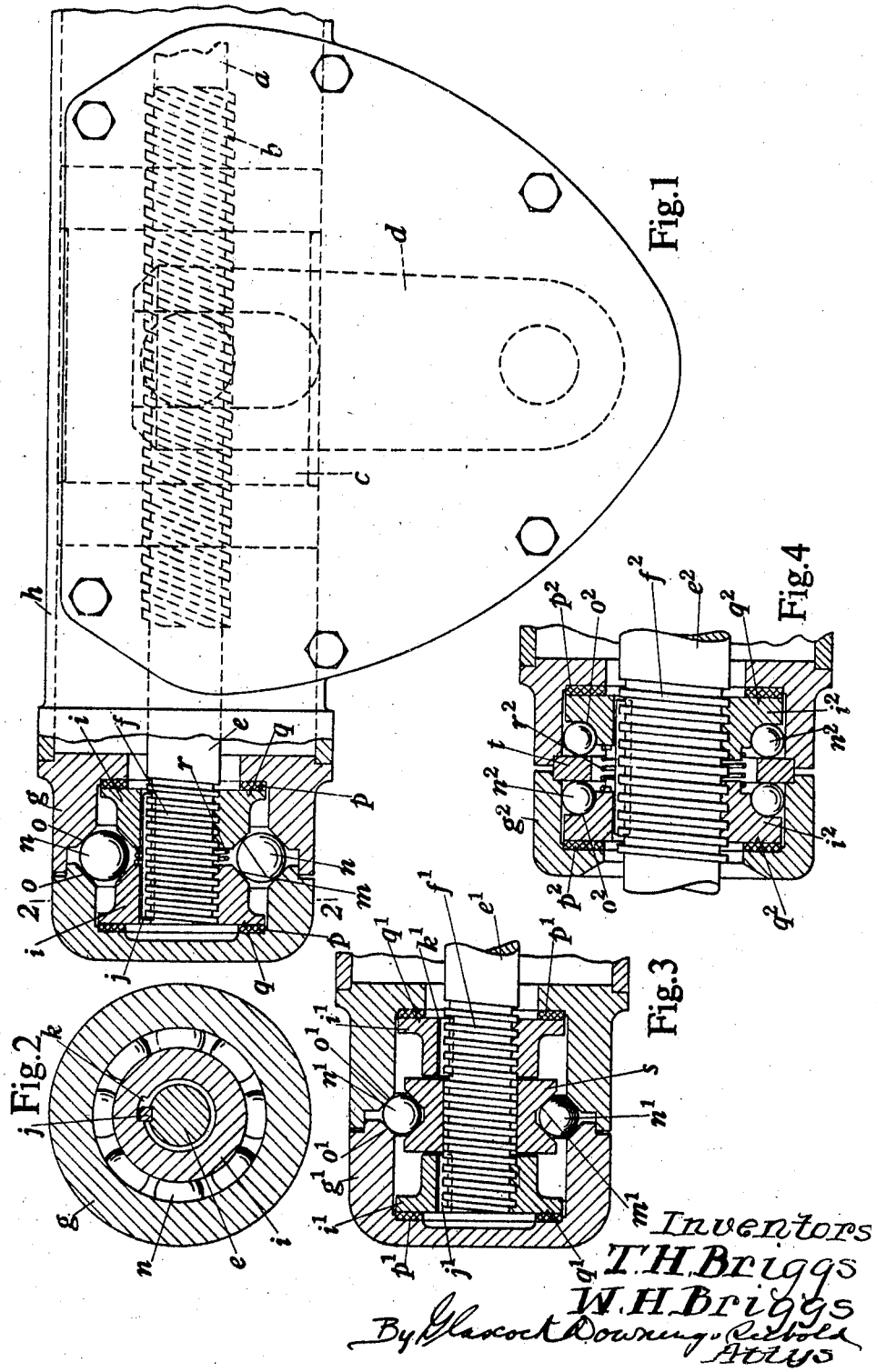

UNITED STATES PATENT OFFICE 2,344,797

VEHICLE STEERING MECHANISM

Thomas Henry Briggs and Walter Henry Briggs, Birmingham, England, assignors to Burman & Sons Limited, Birmingham, England Application December 12, 1942, Serial No. 468,807
In Great Britain July 25, 1942

4 Claims. (Cl. 192—8)

This invention relates to vehicle steering mechanisms and has for its object to provide improved means for minimising transmission to the driver through such a mechanism of forces resulting from irregularities in the road surface.

The invention comprises the combination of a screw-threaded member formed on or adapted to be secured to the spindle of the steering mechanism which is operable by the driver, a pair of nuts mounted on the said screw-threaded member and having a limited angular freedom of movement relatively to the said member, a housing surrounding the nuts, an antifriction thrust bearing contained in the housing and situated between the adjacent ends of the said nuts, and friction surfaces within the housing and adapted to co-operate with the opposite end surfaces of the said nuts, the arrangement being such that the end thrust of the spindle due to normal operation of the mechanism is taken by the antifriction bearing, but end thrust due to a force resulting from an irregularity of the road surface is taken by one or the other of the friction surfaces.

In the accompanying sheet of explanatory drawings:

Figure 1 is a part sectional side elevation of means constructed in accordance with the invention.

Figure 2 is a section on the line 2—2 of Figure 1.

Figures 3 and 4 are views similar to the sectional part of Figure 1 illustrating respectively two modified forms of the invention.

In Figure 1 $a$ indicates the steering spindle of a vehicle steering mechanism, $b$ a screw thread on the spindle, $c$ a slidable but non-rotatable nut engaging the screw thread, and $d$ a lever arm through which the nut can transmit movements from the spindle to the usual linkage associated with the steerable rod wheels of the vehicle.

In carrying the invention into effect as shown in Figures 1 and 2, we form or secure on the end of the steering spindle $a$ remote from the steering wheel (not shown) a coaxial extension $e$ having formed on it a screw thread $f$ of any convenient pitch. The screw-threaded portion of the extension $e$ is surrounded by a housing $g$ adapted to be secured to the steering column $h$ or other fixed part of the vehicle. On the screw-threaded portion of the extension $e$ are mounted a pair of nuts $i$. Each of the nuts $i$ has a limited angular freedom of movement relatively to the screw thread $f$, this being determined conveniently by a longitudinal key $j$ on the screw-threaded portion of the extension $e$ engaging a slot $k$ in each nut, the width of the slot corresponding to the amount of free movement required for the corresponding nut. The adjacent ends of the nuts $i$ are adapted to form an inner race $m$ for a ring of bearing balls $n$, a complementary outer race $o$ being formed on the housing $g$. Each of the outer end faces of the nut is flat, and adjacent to it in the housing $g$ is fixedly mounted a friction ring $p$ having a flat surface $q$ against which the end surface of the nut can abut. Alternatively each friction surface may be formed integrally with the housing.

The initial adjustment of the above described mechanism is such that the outer end faces of the nuts $i$ are in light contact with the friction surfaces $q$, and a slight clearance exists between the nuts and the ring of balls $n$, this condition being assisted by a light helical spring $r$ arranged between the nuts. When a normal steering movement is imparted by the driver to the spindle $a$, the consequent endwise thrust of the spindle is borne by the ring of balls $n$ through the medium of one of the nuts $i$. Simultaneously, the other nut $i$ is momentarily held by its contact with the corresponding friction surface $q$, with the result that due to the interaction of this nut and the screw thread $f$ which it engages it is retracted along the screw thread, sufficiently to relieve any pressure between it and the friction surface. The latter therefore offers no resistance to rotational movement of the spindle $a$ by the driver. In one direction of rotation of the spindle $a$ the above described action causes one of the nuts $i$ to bear against the ring of balls $n$ and the other to be retracted, and in the opposite direction of rotation of the spindle the latter nut is caused to bear on the balls and the former is retracted.

In either case the resistance to rotation of the spindle $a$ is small and the mechanical efficiency of the associated steering mechanism is not appreciably affected. But in the event of a momentary force being communicated to the driving spindle $a$ from the ground wheels such as might (especially in the case of a heavy vehicle) impose a considerable strain on the driver, the action above described is reversed. The end thrust on the spindle $a$ is now taken by one or the other of the nuts $i$ and the corresponding friction surface $q$ (according to the direction of the thrust), and the frictional resistance to rotation of the spindle is now such that the effort required to be exerted by the driver to counteract the thrust is relatively small.

The invention is capable of being carried out in a variety of other ways, all essentially similar in action to that above described, and two typical examples are illustrated respectively in Figures 4 and 5, the parts of these examples similar or analogous to those shown in Figures 1 and 2 being indicated by the same reference chearacters suffixed by 1 in Figure 3 and 2 in Figure 4.

In the example shown in Figure 3, we mount on the screw-threaded portion of the extension $e^1$ a freely rotatable collar $s$ which forms the inner race $m^1$ for the ring of bearing balls $n^1$, the outer race $o^1$ being formed in the housing $g^1$. In this case the adjacent ends of the nuts $i^1$ are flat and are arranged to abut against the side faces of the collar $s$.

In the example shown in Figure 4, we form or mount within the housing between the nuts $i^2$ a fixed annular shoulder $t$ having a pair of flat side faces. Each of the adjacent ends of the nuts $i^2$ is shaped to form a ball race $o^2$, and a ring of bearing balls $n^2$ is placed in each race between the corresponding nut and the adjacent side face of the shoulder.

To enable adjustment to be made for the compensation of wear, we may divide the housing $g$, $g^1$ or $g^2$ transversely so that it consists of two parts as shown, these being secured together in any convenient manner and being such that they allow the axial length of the housing to be adjusted.

The invention is not, however, limited to the examples above described as subordinate details of construction and arrangement may be varied. Thus instead of the bearing balls we may use rollers. Also instead of the screw threads and nuts described we may employ any convenient mechanical equivalents that will effect a helical connection between the inter-related parts so that rotation of one part relatively to the other causes axial movement of the latter, and we desire it to be understood that the terms "screw thread" and "nuts" used herein are intended to include such equivalents.

The invention is more especially useful on so-called high efficiency steering mechanisms, designed so as to require a minimum effort by the driver in normal steering actions, it being in connection with such mechanisms that the effects of road irregularities are most severe and are sometimes such as to constitute a danger to the driver, especially in the case of a heavy road vehicle.

Having thus described our invention what we claim as new and desire to secure by Letters Patent is:

1. Means for minimising the transmission of forces resulting from road surface irregularities to a vehicle driver through the vehicle steering mechanism, comprising the combination of a screw-threaded member rotatable by movements imparted to the steering mechanism by the driver, a pair of nuts mounted on the said screw-threaded member and having a limited angular freedom of movement relatively to the said member, a housing surrounding the nuts, an antifriction thrust bearing contained in the housing and situated between the adjacent ends of the said nuts, and friction surfaces within the housing and adapted to co-operate with the opposite end surfaces of the said nuts, the arrangement being such that the end thrust of the spindle due to normal operation of the mechanism is taken by the antifriction bearing, but end thrust due to a force resulting from an irregularity of the road surface is taken by one or the other of the friction surfaces.

2. Means as claimed in claim 1, in which the thrust bearing comprises in combination an inner race on the adjacent ends of the nuts, an outer race on the housing, and a ring of antifriction members between the inner and outer races.

3. Means as claimed in claim 1, in which the thrust bearing comprises in combination, a freely rotatable collar mounted on the screw-threaded member between the adjacent ends of the nuts and forming an inner race, an outer race on the housing, and a ring of antifriction members between the inner and outer races.

4. Means as claimed in claim 1 in which the antifriction thrust bearing comprises in combination a fixed annular shoulder provided in the housing and having a pair of flat side faces, a race on each of the adjacent ends of the nuts, and a ring of antifriction members arranged in each race between the corresponding nut and the adjacent flat face of the shoulder.

THOMAS HENRY BRIGGS.
WALTER HENRY BRIGGS.